(12) United States Patent
Chin

(10) Patent No.: US 6,474,828 B1
(45) Date of Patent: Nov. 5, 2002

(54) ILLUMINANT RADIO COMMUNICATION DEVICE

(75) Inventor: Yuan-Cheng Chin, Hsintien (TW)

(73) Assignee: Unity Opto Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/942,646

(22) Filed: Aug. 31, 2001

(51) Int. Cl.$^7$ ................................................ H04M 1/22
(52) U.S. Cl. ...................... 362/88; 362/234; 362/253; 379/110.01; 455/572
(58) Field of Search ............................ 362/24, 88, 800, 362/234, 253; 379/110.01; 455/572

(56) References Cited

U.S. PATENT DOCUMENTS

| | | | | |
|---|---|---|---|---|
| 5,029,205 A | * | 7/1991 | Archer | 362/253 |
| 5,901,206 A | * | 5/1999 | Soon | 362/88 |
| 6,341,871 B1 | * | 1/2002 | Angelopoulos | 362/88 |

* cited by examiner

Primary Examiner—Stephen Husar
(74) Attorney, Agent, or Firm—Troxell Law Office PLLC

(57) ABSTRACT

An illuminant radio communication device has a console and a cordless phone communicating with the console. The cordless phone has at least one light emitting diode controlled by the control button on the cordless phone so that the cordless phone is able to provide sufficient light when needed.

3 Claims, 4 Drawing Sheets

ILLUMINANT RADIO COMMUNICATION DEVICE

BACKGROUND OF THE INVENTION

1. Field of the Invention

The present invention relates to an illuminant radio communication device, and more particularly to a radio communication device that is able to transmit light for emergency.

2. Description of Related Art

Nowadays, the communication device used for either indoor or outdoor includes telephone and intercom which are connected to embedded phone wires. That is, either the telephone or the intercom is set at a fixed location. To facilitate the portability, cordless phone is invented and introduced to the market. However, if there is a power failure, people will not have sufficient light to find the phone for help. Especially when there is a natural disaster and when buildings are collapsed and roads are closed, people would have difficulty reaching for help when trapped in the debris. Under such a circumstance, even the user has a flash light, the user is still trapped in the debris.

To overcome the shortcomings, the present invention intends to provide an improved illuminant radio communication device to mitigate or obviate the aforementioned problems.

SUMMARY OF THE INVENTION

The primary objective of the invention is to provide an illuminant radio communication device so that not only the user is able to have sufficient light in the dark, but also the user has the access to reach help from others when trapped in a difficult situation.

Other objects, advantages and novel features of the invention will become more apparent from the following detailed description when taken in conjunction with the accompanying drawings.

DETAILED DESCRIPTION OF PREFERRED EMBODIMENT

Figure 1:
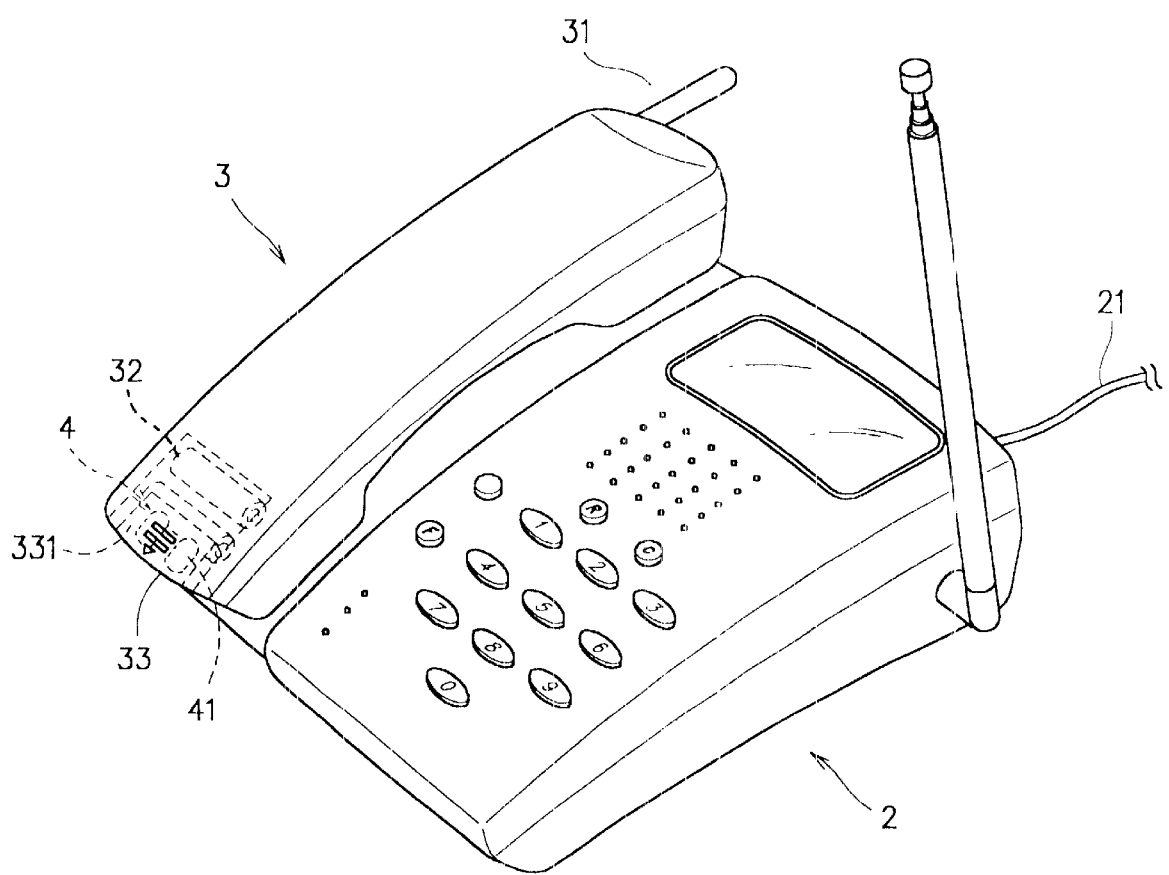
FIG. 1 is a perspective view of the first preferred embodiment of the radio communication device with an illumination device mounted in the radio communication device.
Figure 2:
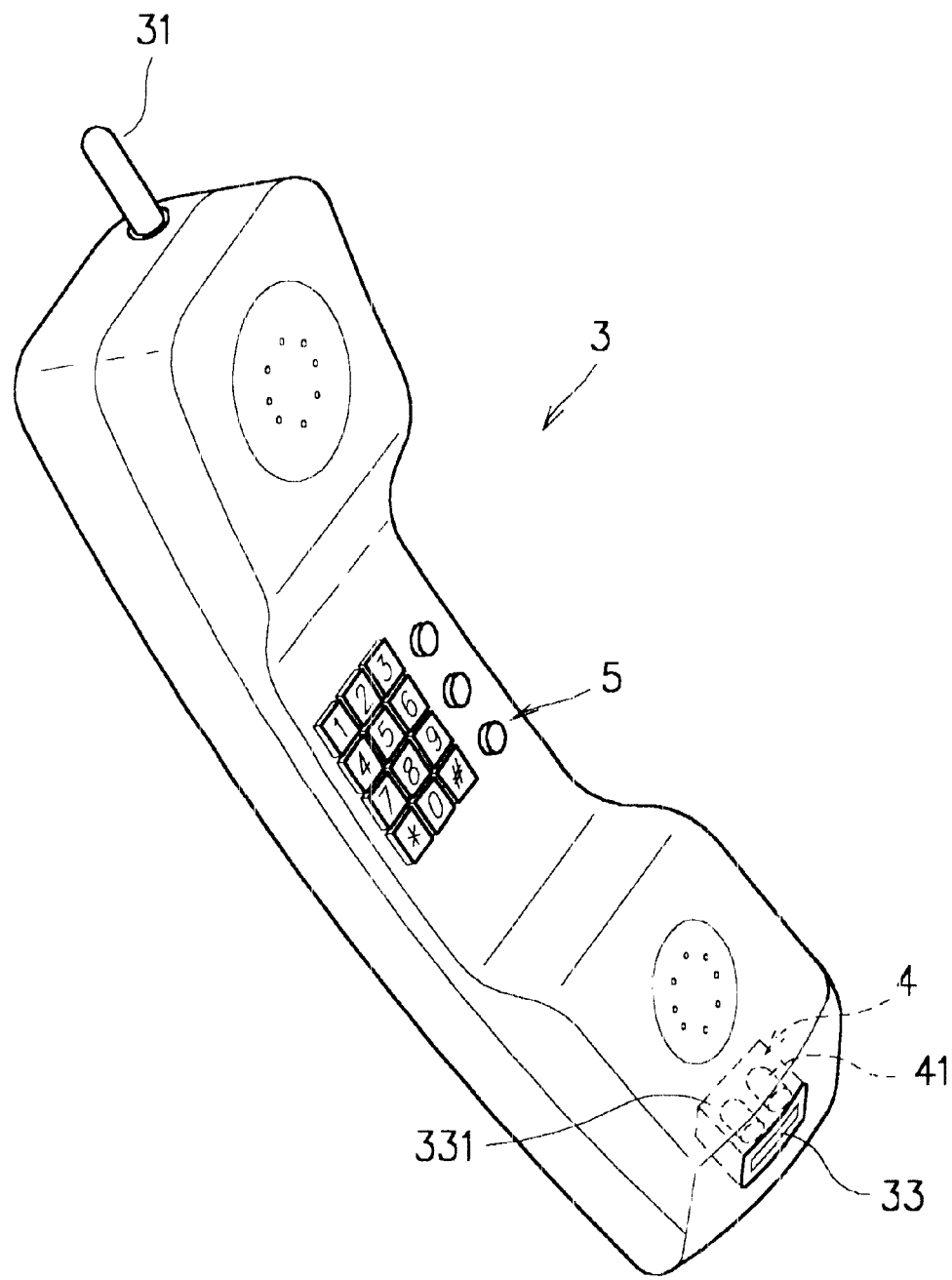
FIG. 2 is a perspective view of the cordless phone from the radio communication device.

With reference to FIG. 1 and FIG. 2, a first preferred embodiment of the illuminant radio communication device has a console (2) with a communicating line (21) extending out from the console (2) and a cordless phone (3) with a communicating unit (31) to communicate with the console (2) and a power supply (32) mounted inside the cordless phone (3) so that the cordless phone (3) is able to support itself and function normally.

The cordless phone (3) further has a transparent cap (33) mounted on top of the cordless phone (3), a chamber (331) defined in the cordless phone (3) to be covered by the transparent cap (33), an illuminating device (4) with at least one LED (light emitting diode) (41) (or light bulb) received in the chamber (331) and electrically connected to the power supply (32). The cordless phone (5) further has a control button (5) mounted on the cordless phone (3) to control on/off of the illuminating device (4).

With such an arrangement, it is noted that because the illuminating device (4) is connected to the power supply (32) of the cordless phone (3), the control button (5) is able to control the LED (41) to transmit light when needed. Within the embodiment, the power supply (32) of the cordless phone (3) is a battery set so that even when there is a power failure, the power supply (32) is still able to provide electricity to the illuminating device (4) for the LED (41) to transmit light.

Figure 3:
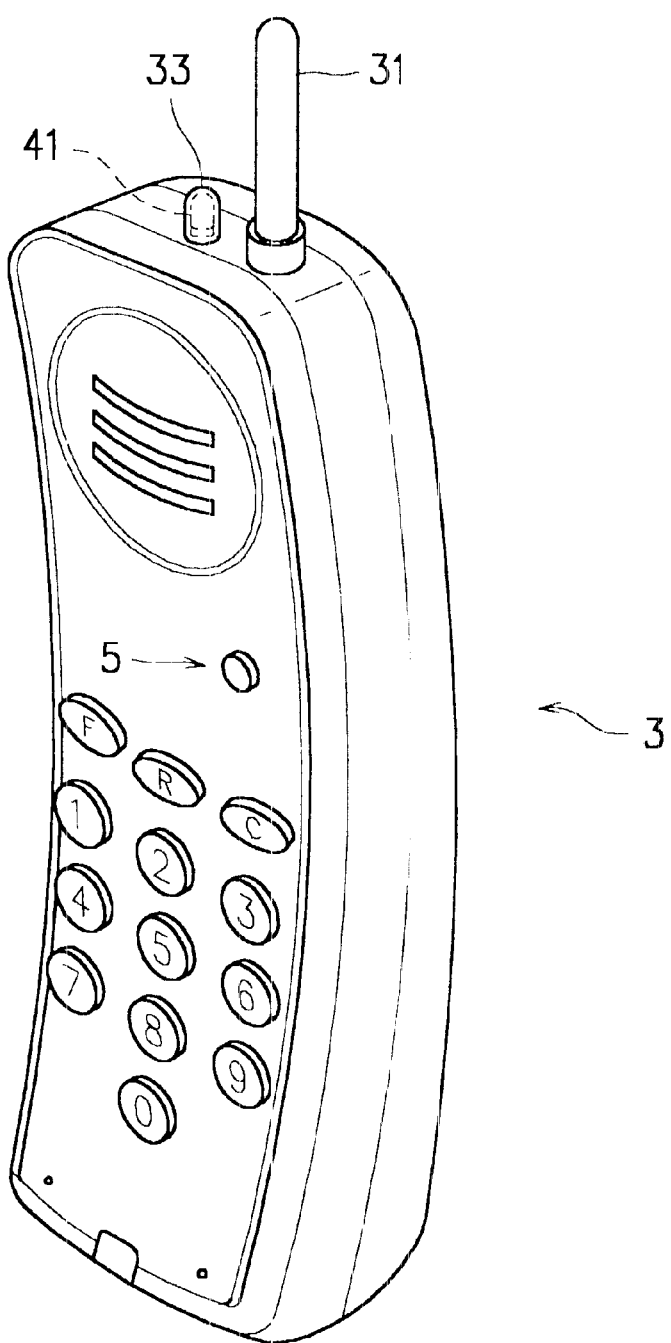
FIG. 3 is a perspective view of a second preferred embodiment of the radio communication device.
Figure 4:
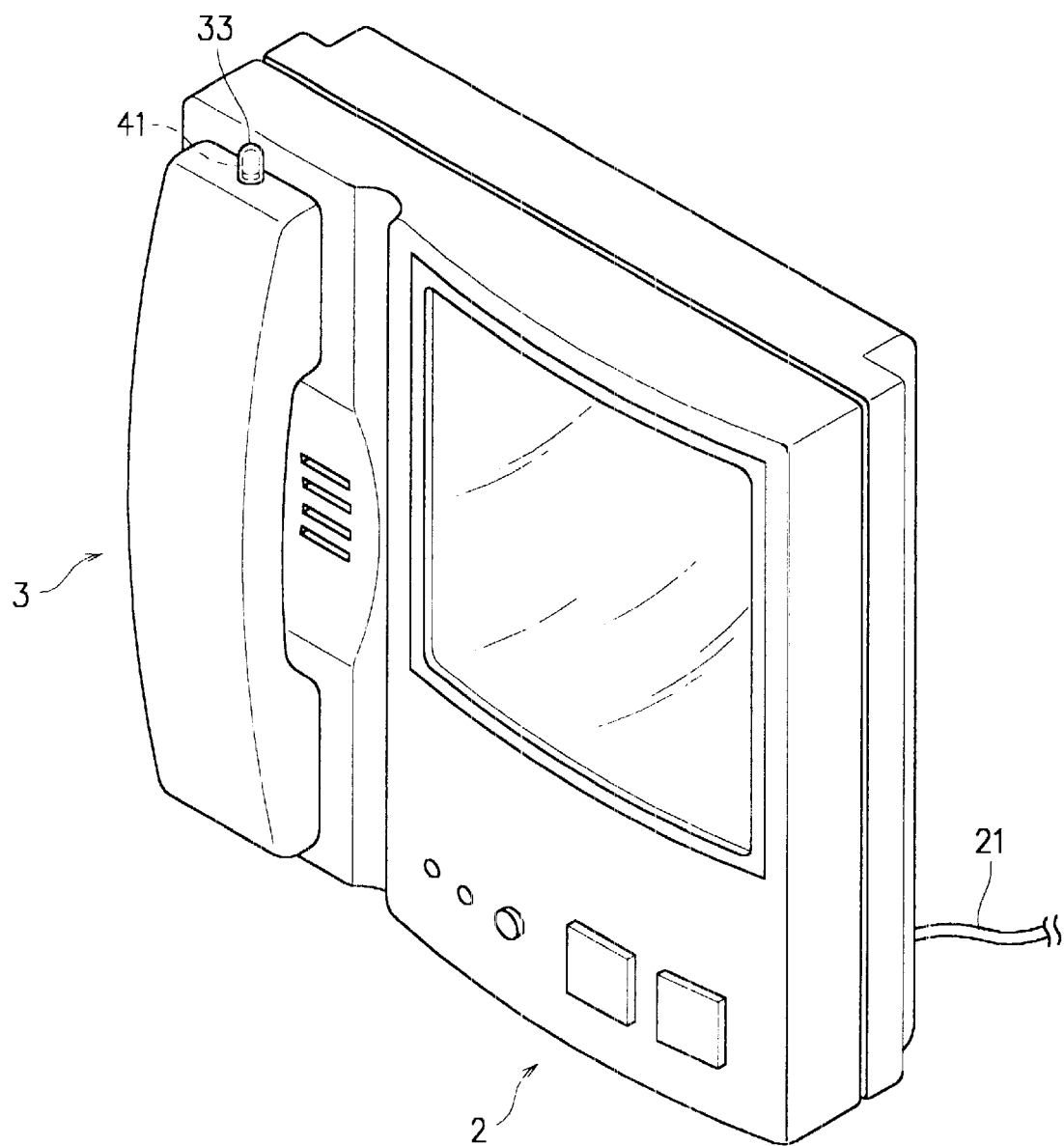
FIG. 4 is a perspective view of a third preferred embodiment of the radios communication device.

With reference to FIGS. 3 and 4, it is noted that the radio communication device is not limited to the indoor telephone set as described in FIGS. 1 and 2. The illuminating device (4) may be mounted any where on the cordless phone (3) and the console of the radio communication device may still be an intercom (2) with communicating line (21) extending out from the console so that the user is able to grab the cordless phone (3) any where.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An illuminant radio communication device having a console with a cordless phone communicating with the console and having a power supply, wherein the improvements comprise:

a chamber defined in the cordless phone;

a transparent cap covered on top of the chamber;

an illuminating device received in the chamber and adapted to be electrically connected to the power supply; and a control button adapted to be mounted on the cordless phone to control the illuminating device to transmit light.

2. The illuminant radio communication device as claimed in claim 1, wherein the illuminating device includes at least one light emitting diode.

3. The illuminant radio communication device as claimed in claim 1, wherein the illuminating device is a light bulb.

* * * * *